UNITED STATES PATENT OFFICE.

EUDO MONTI, OF TURIN, ITALY.

ART OF MAKING JAMS, JELLIES, AND MARMALADES OF FRUITS.

1,398,339.          Specification of Letters Patent.      Patented Nov. 29, 1921.

No Drawing.      Application filed March 28, 1919. Serial No. 285,906.

*To all whom it may concern:*

Be it known that I, EUDO MONTI, doctor of chemistry, subject of the King of Italy, residing at 20 via Figlie dei Militari, Turin, Italy, have invented certain new and useful Improvements in the Art of Making Jams, Jellies, and Marmalades of Fruits, of which the following is a specification.

The present invention relates to certain new and useful improvements in the art of making jams, jellies and marmalades of fruits, and especially of grapes, having the unaltered taste and flavor and also the properties of the grapes and fruits from which they have been prepared.

It is known that fruit jams, marmalades and jellies owe their consistency to the pectin contained in some fruits, such as apples, currants, gooseberries, bitter and sweet oranges, quinces and the like.

Also some kinds of grapes such as Concord, contain a considerable quantity of pectin, which will gelatinize when concentrated or mixed with a suitable quantity of sugar. It is known that the pectin contained in fruits, also in sea weeds (agar agar) and in animal glue will lose its gelatinizing property if boiled for a long time under atmospheric pressure. Therefore the usual process of making jelly consists in evaporating very quickly the juice containing the pectin in a small pan heated with steam at high pressure till it is thick enough to gelatinize as soon as a suitable quantity of sugar is added. During this violent ebullition all the flavor will evaporate, also in contact with high pressure steam the vegetal albumin will curdle and not only the enzyms but also the salts and acids contained in fresh juice will be altered and all their beneficial properties will be lost.

The present invention has for its aim to avoid the above referred inconveniences allowing me to prepare jellies, jams and marmalades, having the natural taste of grapes, strawberries and other scented fruits whose scent would volatilize at a high temperature and to make them consistent and unalterable without submitting them to such a temperature that would alter their taste and their dietetic properties.

Repeated experiments have taught me that the pectin contained in the apples, pears, grapes, oranges, and other fruits, also in gooseberries, and currants can be extracted by systematically exhausting said fruits finely chopped or smashed with lukewarm water at a temperature more or less elevated according to the kind of fruit and not exceeding 50° C. if the fruit is grapes. I have also ascertained that by concentrating at a low temperature in vacuum in an apparatus acting continuously and automatically the pectin thus extracted, I obtain concentrated solutions containing even 80% of dry extract which has not lost any of the gelatinizing power due to the pectin they contain so that their gelatinizing power is far superior to that of the juice concentrated even very quickly with steam under atmospheric pressure. I have also ascertained that adding a moderate percentage of such solution containing pectin (from 20 to 25%) to the grape juice and also to strawberries, raspberries, redberries, or other scented fruit juice suitably concentrated at a low temperature, if the mixture contains at least 65% dry extract and not less than 50% grape or fruit sugar or saccharose, will keep provided it contains at least 1% acidity calculated as tartaric acid. I obtain thus jams, marmalades or jellies which are as consistent as the common marmalades and will keep unaltered without being sterilized thus maintaining unaltered the taste and flavor of the fresh fruit. None of the substances contained in said fruits having been altered by the heat they will also have all the digestive, dietetic, feeding and therapeutic effects of the fruits from they have been made, none of the matters herein contained having been altered, the enzyms, the vitamins and the ormones included. If, in the preparation of jams, jellies and marmalades I add to the pectic solution, grape juice or fruit juice concentrated, oxidized and hydrolyzed at a low temperature in the way described in my copending application, the jams and jellies thus obtained though very consistent will have exactly the taste and flavor of the fresh fruit.

To make my invention perfectly understood, I will here describe the preparation of the product also the apparatus which will be claimed in a copending application.

I first prepare the gelatinizing solution by systematically exhausting, the grapes, currants, gooseberries, apples, oranges or the like by the process described in my U. S. Patent 1167006 dated Jan. 4 1916. On the other hand I prepare the concentrated juice of grape, raspberries and other fruits by the process described and claimed in my copending application.

I take the pectic solution prepared by exhausting the apples, quinces, gooseberries, and the like and introduce it in a lukewarm water evaporator as described in my copending application, and provided with an agitator and concentrate it at a temperature not exceeding 40° C. to a thickness of about 80 to 85% dry extract. I then stop the vacuum pump and cause the mass to warm to about 60° C. more or less according to the delicacy of the flavor of the grape or fruit, by circulating lukewarm water in the coils and double bottoms, and add the scented juice constantly agitating till the lukewarm mass has become homogenous and contains from 60 to 70% of dry extract, which concentration is sufficient to make the jam keep without sterilizing it provided it contains enough sugar and acids as above described. I open then the key at the bottom of the apparatus and pour the jelly which being still warm has not lost its fluidity in pots or jars where it will gelatinize as soon as allowed to cool. I then extract the obturator and clean the apparatus extracting the thicker jelly adhering to the double bottom and coils before replacing the obturator so that the apparatus will be ready for another operation.

Having thus described my invention, what I claim is:

1. The process of preparing pectin which comprises exhausting fruit which contains pectin with water and concentrating the pectic solution by warming in vacuum, the temperature of the pectic solution being at all times kept below the temperature at which the flavoring and dietetic ingredients of the particular fruit treated would be altered.

2. The process of making jams, jellies and marmalades, which comprises concentrating a quantity of fruit at temperatures less than the freezing point of water and mixing 20 to 25% of such concentrated fruit with a concentrated pectic solution.

3. The process of making jams, jellies and marmalades which comprises concentrating pectic solution to a density from 75 to 85% dry extract, concentrating a separate quantity of fruit to a density of about 45% dry extract at temperatures less than the freezing point of water, and mixing the concentrated fruit with the concentrated pectic solution in the proportions of 20 to 25% of the former to 80 to 75% of the latter.

4. The process of making jams, jellies and marmalades as set forth in claim 3 comprising the further step of adding to the pectic solution before mixing, quantities of sugar and acid sufficient to bring the total sugar content of the mix up to 50% and the acidity up to 1%.

In testimony whereof the foregoing specification is signed in the presence of two witnesses.

EUDO MONTI.

Witnesses:
FRANCESCO PORLUTO,
GIUSEPPE D. LEO.